US011773963B2

(12) United States Patent
Sheppard et al.

(10) Patent No.: US 11,773,963 B2
(45) Date of Patent: Oct. 3, 2023

(54) WIND TURBINE GEARBOX CARRIER WITH INTEGRATED PIN SHAFTS AND METHOD OF MANUFACTURING SAME

(71) Applicant: General Electric Company, Schenectady, NY (US)

(72) Inventors: Collin McKee Sheppard, Greenville, SC (US); Fulton Jose Lopez, Simpsonville, SC (US); Raed Zuhair Hasan, Greenville, SC (US); Dhanushkodi Durai Mariappan, Albany, NY (US); Ryan Eric Vogel, Greer, SC (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 16/915,059

(22) Filed: Jun. 29, 2020

(65) Prior Publication Data
US 2021/0404548 A1    Dec. 30, 2021

(51) Int. Cl.
*F16H 57/08*   (2006.01)
*F03D 15/00*   (2016.01)
(Continued)

(52) U.S. Cl.
CPC ........... *F16H 57/082* (2013.01); *F03D 15/00* (2016.05); *F16H 1/28* (2013.01); *F16H 57/0427* (2013.01);
(Continued)

(58) Field of Classification Search
CPC ............................ F16H 57/082; F16H 57/0479
See application file for complete search history.

(56) References Cited

U.S. PATENT DOCUMENTS

| 2,688,263 A | 9/1954 | Rockwell |
| 3,154,970 A | 11/1964 | Gebhardt et al. |

(Continued)

FOREIGN PATENT DOCUMENTS

| CA | 2679726 A1 | 11/2009 |
| DE | 69914707 T2 | 11/2004 |

(Continued)

OTHER PUBLICATIONS

Anonymous, ISO/ASTM52900—15 Standard Terminology for Additive Manufacturing—General Principles—Terminology, ASTM International, Products and Services, Standards & Publications, Standards Products, XP055374490, Jan. 1, 2015. (Web Page Only) Retrieved from: https://www.astm.org/Standards/ISOASTM52900.htm.

(Continued)

*Primary Examiner* — Derek D Knight
(74) *Attorney, Agent, or Firm* — Dority & Manning, P.A.

(57) ABSTRACT

A gear system includes a carrier having a first portion and a separate, second portion and a plurality of pin shafts extending from the first portion of the carrier. Each of the plurality of pin shafts includes a first end and a second end. As such, the first ends are integrally formed with the first portion of the carrier. The first and second portions are arranged on opposing sides of the plurality of pin shafts and are spaced apart such that the first and second portions do not contact each other. Further, the second portion of the carrier defines an end plate that is secured to the second ends of the plurality of pin shafts. The gear system also includes a plurality of gears mounted to the plurality of pin shafts, with each of the plurality of gears arranged so as to rotate around one of the plurality of pin shafts.

14 Claims, 12 Drawing Sheets

(51) Int. Cl.
*F16H 1/28* (2006.01)
*F16H 57/04* (2010.01)
*F16H 57/00* (2012.01)

(52) U.S. Cl.
CPC ..... *F16H 57/0479* (2013.01); *F16H 57/0486* (2013.01); *F05B 2260/40311* (2013.01); *F16H 2057/0056* (2013.01); *F16H 2057/0087* (2013.01)

(56) References Cited

U.S. PATENT DOCUMENTS

| | | | |
|---|---|---|---|
| 3,303,713 | A | 2/1967 | Hicks |
| 3,352,178 | A * | 11/1967 | Lindgren ................ F16H 1/28 |
| | | | 475/343 |
| 3,943,787 | A | 3/1976 | Hicks |
| 4,104,933 | A | 8/1978 | Campbell |
| 4,504,554 | A | 3/1985 | Yoshioka |
| 5,649,879 | A | 7/1997 | Kusumoto et al. |
| 6,422,970 | B1 | 7/2002 | Paroli |
| 6,883,235 | B2 | 4/2005 | Bell |
| 8,147,145 | B2 | 4/2012 | Inoue et al. |
| 8,235,861 | B2 | 8/2012 | Lopez et al. |
| 8,376,902 | B2 | 2/2013 | Fox et al. |
| 8,430,788 | B2 | 4/2013 | Fox et al. |
| 8,591,371 | B2 | 11/2013 | Dinter et al. |
| 8,672,797 | B2 | 3/2014 | Fox |
| 8,690,539 | B2 | 4/2014 | Hohle et al. |
| 8,702,558 | B2 | 4/2014 | Smook |
| 8,758,190 | B2 | 6/2014 | Montestrue |
| 8,920,284 | B2 * | 12/2014 | Fox .................. F16C 43/04 |
| | | | 475/346 |
| 8,961,362 | B2 | 2/2015 | Fox et al. |
| 9,103,413 | B2 | 8/2015 | Curti et al. |
| 9,162,423 | B2 | 10/2015 | Boeschen et al. |
| 9,435,376 | B2 | 9/2016 | Gaertner et al. |
| 9,458,880 | B2 | 10/2016 | Kari et al. |
| 9,713,843 | B2 | 7/2017 | Snyder et al. |
| 10,330,174 | B2 | 6/2019 | Nies et al. |
| 10,682,705 | B2 | 6/2020 | Nies |
| 11,391,217 | B2 * | 7/2022 | Winely ................ F16H 57/082 |
| 11,473,653 | B2 * | 10/2022 | Fauteux ................ F16H 13/10 |
| 2003/0008748 | A1 | 1/2003 | Fox |
| 2008/0194378 | A1 | 8/2008 | Fox |
| 2010/0056321 | A1 | 3/2010 | Snyder et al. |
| 2010/0197444 | A1 | 8/2010 | Montestruc |
| 2011/0171026 | A1 | 7/2011 | Kolpin et al. |
| 2012/0009811 | A1 | 1/2012 | He et al. |
| 2012/0028755 | A1 | 2/2012 | Erno et al. |
| 2012/0108380 | A1 | 5/2012 | Dinter |
| 2012/0184404 | A1 | 7/2012 | Chobot et al. |
| 2013/0337967 | A1 | 12/2013 | Kleine-Brockhoff et al. |
| 2014/0141930 | A1 | 5/2014 | Gerke et al. |
| 2016/0023272 | A1 | 1/2016 | Mongillo |
| 2016/0298751 | A1 | 10/2016 | McCune |
| 2018/0195559 | A1 | 7/2018 | Hallman |
| 2018/0241289 | A1 | 8/2018 | Desbiens et al. |
| 2019/0136945 | A1 | 5/2019 | Nies et al. |
| 2019/0321892 | A1 * | 10/2019 | Nies ................ F16H 57/082 |

FOREIGN PATENT DOCUMENTS

| | | |
|---|---|---|
| GB | 274396 A | 7/1927 |
| IN | 201000506 I2 | 9/2016 |
| JP | 2008196702 A | 8/2008 |
| WO | WO 00/23718 A1 | 4/2000 |
| WO | WO2009/102853 A1 | 8/2009 |
| WO | WO2012/165928 A2 | 12/2012 |
| WO | WO 2019/086343 A1 | 5/2019 |

OTHER PUBLICATIONS

European Search Report for EP Application No. 21182529.4, dated Oct. 26, 2021.
EP Office Action for EP application No. 21182529.4, dated Apr. 12, 2023, 8 pages.

* cited by examiner

WIND TURBINE GEARBOX CARRIER WITH INTEGRATED PIN SHAFTS AND METHOD OF MANUFACTURING SAME

FIELD

The present disclosure relates in general to wind turbines, and more particularly to a wind turbine gearbox and methods of manufacturing same.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planetary, ring and/or sun gears as well as non-planetary gears) connected via one or more planetary carriers and bearings for converting the low speed, high torque input of the rotor shaft to a high speed, low torque output for the generator. In addition, each of the gears rotates about a pin shaft arranged within the one or more planetary carriers. Further, a bearing is typically positioned around each of the pin shafts between a respective pin shaft and a rotating gear. In addition, lubrication is generally provided between each of the bearings and the rotating gears.

The function of the carrier is to transfer torque from the rotor shaft to the planetary gears. In a traditional carrier, the flanges provide nearly all the stiffness between the rotor-side and generator-side of the carrier, which is needed to transmit the torque. Therefore, due to the size, material, and function thereof, conventional carriers are one of the most expensive components to manufacture in a wind turbine.

Accordingly, a gearbox assembly for a wind turbine that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a gear system. The gear system includes a carrier having a first portion and a separate, second portion and a plurality of pin shafts extending from the first portion of the carrier. Each of the plurality of pin shafts includes a first end and a second end. As such, the first ends are integrally formed with the first portion of the carrier. The first and second portions are arranged on opposing sides of the plurality of pin shafts and are spaced apart such that the first and second portions do not contact each other. Further, the second portion of the carrier defines an end plate that is secured to the second ends of the plurality of pin shafts. The gear system also includes a plurality of gears mounted to the plurality of pin shafts, with each of the plurality of gears arranged so as to rotate around one of the plurality of pin shafts.

In an embodiment, the first ends of the plurality of pin shafts being integrally formed with the first portion of the carrier provide structural stability to the gear system such that the gear system is absent of axially-extending webs between the first and second portions of the carrier.

In another embodiment, the end plate may include a plurality of shaft holes. In such embodiments, each of the plurality of shaft holes is configured to receive one of the plurality of pin shafts.

In other embodiments, the end plate may be secured to the plurality of pin shafts via an interference fit between each of the plurality of pin shafts and each of the plurality of holes.

In additional embodiments, the end plate may define a shape that includes an annular base portion defining an inner diameter and an outer diameter. In such embodiments, the inner diameter defines a central aperture, the plurality of shaft holes being arranged circumferentially around the central aperture at an edge of the annular base portion. Further, in particular embodiments, outer diameters of each of the plurality of shaft holes extend beyond the outer diameter of the annular base portion.

In additional embodiments, a design of the gear system may be optimized based on one or more design variables input to a computer-implemented loads model of the gear system so as to minimize mass of the gear system. For example, in an embodiment, the design variable(s) may include the outer diameter of the first portion of the carrier, an inner diameter of each of the plurality of pin shafts, the outer diameters of each of the plurality of shaft holes, an outer diameter of the annular base portion, a thickness of the first portion of the carrier, a thickness of each of the plurality of shaft holes, and/or a thickness of the annular base portion.

In particular embodiments, the gear system may be part of a wind turbine power system. In such embodiments, the gear system may be oriented such that the first portion of the carrier is positioned on a rotor-side of the wind turbine power system and the second portion of the carrier is positioned on a generator-side of the wind turbine power system.

In still further embodiments, the end plate may include a downwind carrier bearing shoulder arranged circumferentially around the central aperture. Further, the downwind carrier bearing shoulder may be on the generator-side of the wind turbine power system so as to receive a generator shaft.

In additional embodiments, the end plate and the plurality of pin shafts each may include a plurality of corresponding fastener holes. Thus, in certain embodiments, the end plate may be secured to the plurality of pin shafts via a plurality of fasteners received through the plurality of corresponding fastener holes. Further, in an embodiment, the plurality of fasteners may include bolts, pins, or the like.

In an embodiment, one or more of the plurality of pin shafts may be hollow. In another embodiment, one or more of the plurality of pin shafts may include one or more oil passages formed therein via at least one of casting, additive manufacturing, or machining.

In another aspect, the present disclosure is directed to a method for manufacturing a gear system of a gearbox of a wind turbine. The method includes forming a first portion of a carrier of the gear system and a plurality of pin shafts of the gear system as a single part. Each of the plurality of pin shafts has a first end and a second end. The first ends are integrally formed with the first portion of the carrier such that the second ends extend outwards therefrom. Further, the method includes positioning a plurality of gears onto the plurality of pin shafts. Moreover, the method includes securing a second portion of the carrier to the second ends of the plurality of pin shafts such that the first and second portions do not contact each other.

In an embodiment, the method may include providing a bearing onto each of the plurality of pin shafts before positioning the plurality of gears onto the plurality of pin shafts.

In another embodiment, providing the bearing onto each of the plurality of pin shafts before positioning the plurality of gears onto the plurality of pin shafts may include forming, via a computer numerical control (CNC) device, the bearing directly onto each of the plurality of pin shafts via an additive manufacturing process after forming the first portion of the carrier and the plurality of pin shafts as the single part and before positioning the plurality of gears onto the plurality of pin shafts.

In further embodiments, the additive manufacturing process may include, for example, binder jetting, material jetting, laser cladding, cold spray deposition, directed energy deposition, powder bed fusion, material extrusion, or vat photopolymerisation.

In an embodiment, the method may also include forming at least one additional feature into one or more of the bearings, the first and second portions of the carrier, or one or more of the pin shafts via additive manufacturing. In such embodiments, the additional feature(s) may include, for example, an oil passage, one or more ribs, one or more channels, or one or more recesses.

In certain embodiments, forming the first portion of the carrier and the plurality of pin shafts as the single part may include casting the first portion of the carrier and the plurality of pin shafts. In alternative embodiments, forming the first portion of the carrier and the plurality of pin shafts as the single part may include pouring a liquid material into a mold of the first portion of the carrier, allowing the liquid material to solidify in the mold so as to form the first portion of the carrier, and additively molding or printing the plurality of pin shafts to the first portion of the carrier.

In additional embodiments, securing the end plate to the second ends of the plurality of pin shafts may include utilizing press fitting or one or more fasteners.

It should also be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
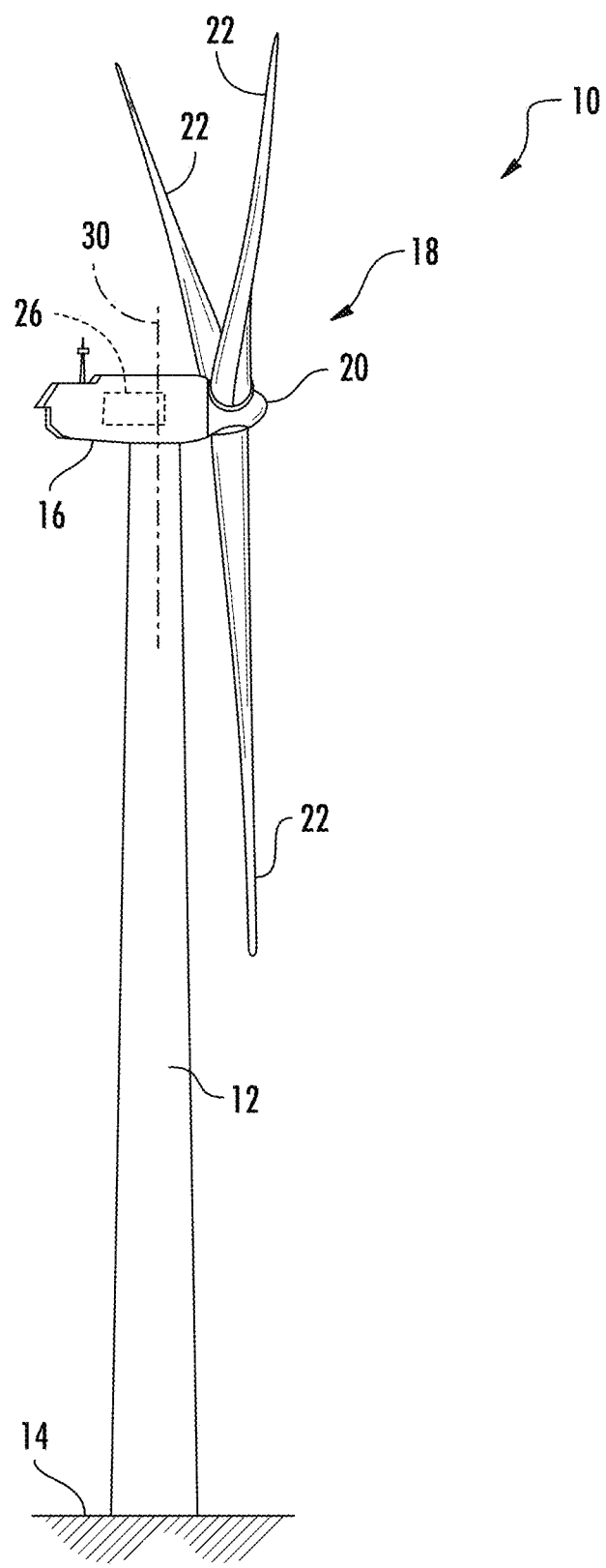
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gear system having a plurality of pins shafts formed integrally with a first portion of a carrier. A separate, second portion of the carrier is then secured to an opposing side of the pin shafts, without webbing between the first and second portions. Thus, by integrating the pin shafts into the first portion of the carrier, the pin shafts become structural components that add to the rigidity of the gear system, thereby allowing for the removal of the webs that previously extending therebetween. Therefore, an overall reduction of material of the gear system is achieved. In particular embodiments, the pin shafts can be cast, which may also contribute to reduced costs. This concept separates a traditional one-piece carrier into two separate and distinct parts (i.e. the first and second portions of the carrier described herein), but integrates the pin shafts into the first portion of the carrier, so the total number of components decreases. In addition, the present disclosure may utilize additive manufacturing to incorporate bearings between the pin shafts and the gears.

Thus, the present disclosure provides many advantages not present in the prior art. For example, the methods and systems of the present disclosure enable a smaller envelope for the gear system, use less material, have a reduced weight, and require less machining and/or assembly time. Additional benefits are increased rigidity which can lead to better gear meshing and longer life and reliability.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
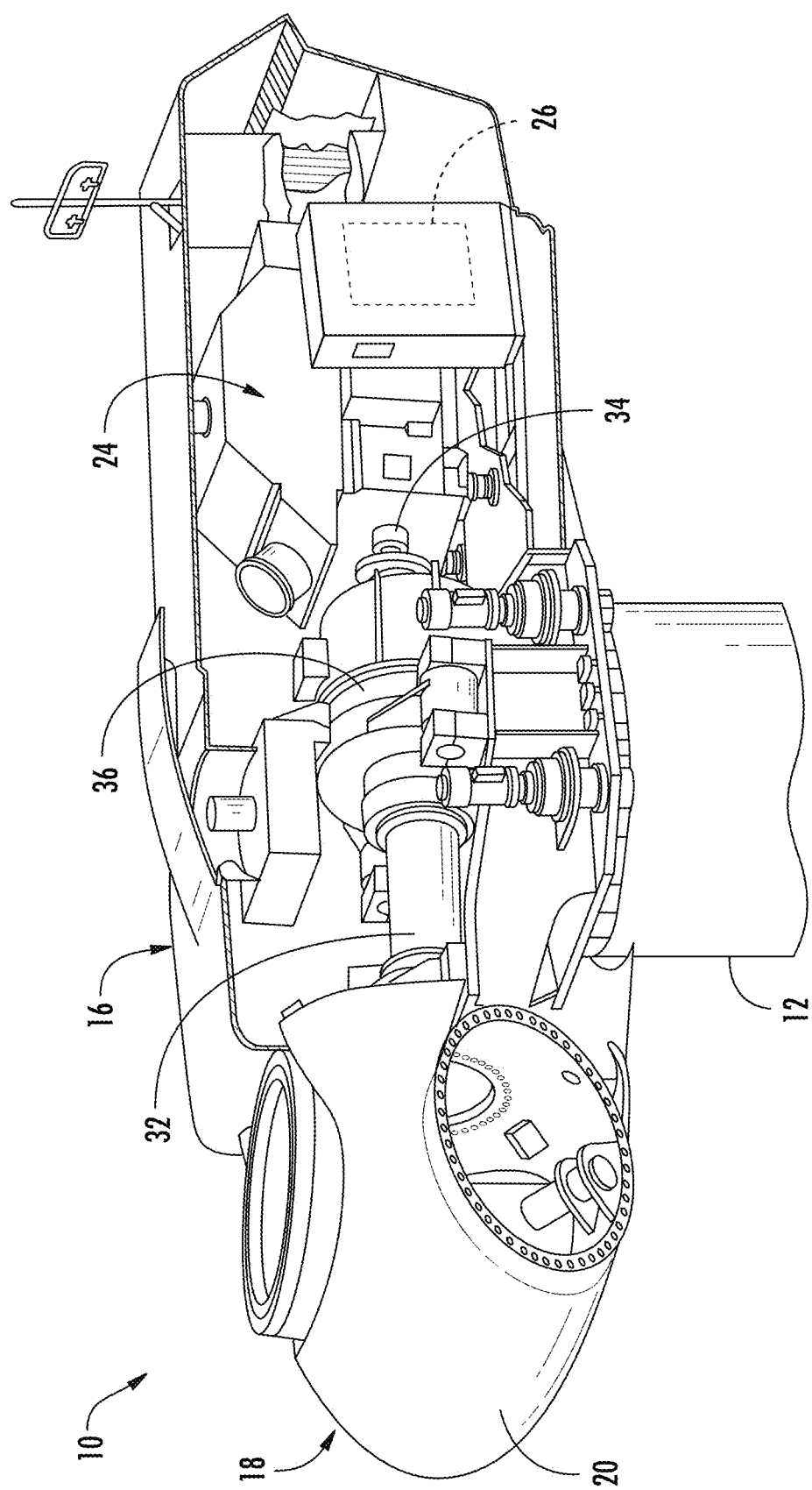
FIG. 2 illustrates a detailed, internal view of one embodiment of a nacelle of a wind turbine according to the present disclosure.

As shown, the wind turbine 10 may also include a turbine control system or a turbine controller 26 centralized within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., start-up or shut-down sequences) and/or components of the wind turbine 10.

Referring now to FIG. 2, a simplified, internal view of a nacelle 16 of the wind turbine 10 according to conventional construction is illustrated. As shown, the generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox assembly 36. As is generally understood, the rotor shaft 32 may provide a low speed, high torque input to the gearbox assembly 36 in response to rotation of the rotor blades 22 and the hub 20. The gearbox assembly 36 may then be configured to convert the low speed, high torque input to a high speed, low torque output to drive the generator shaft 34 and, thus, the generator 24. In alternative embodiments, the rotor shaft 32 may be eliminated and the rotatable hub 20 may be configured to turn the gears of the gearbox assembly 36, rather than requiring a separate rotor shaft 32.

Figure 3:
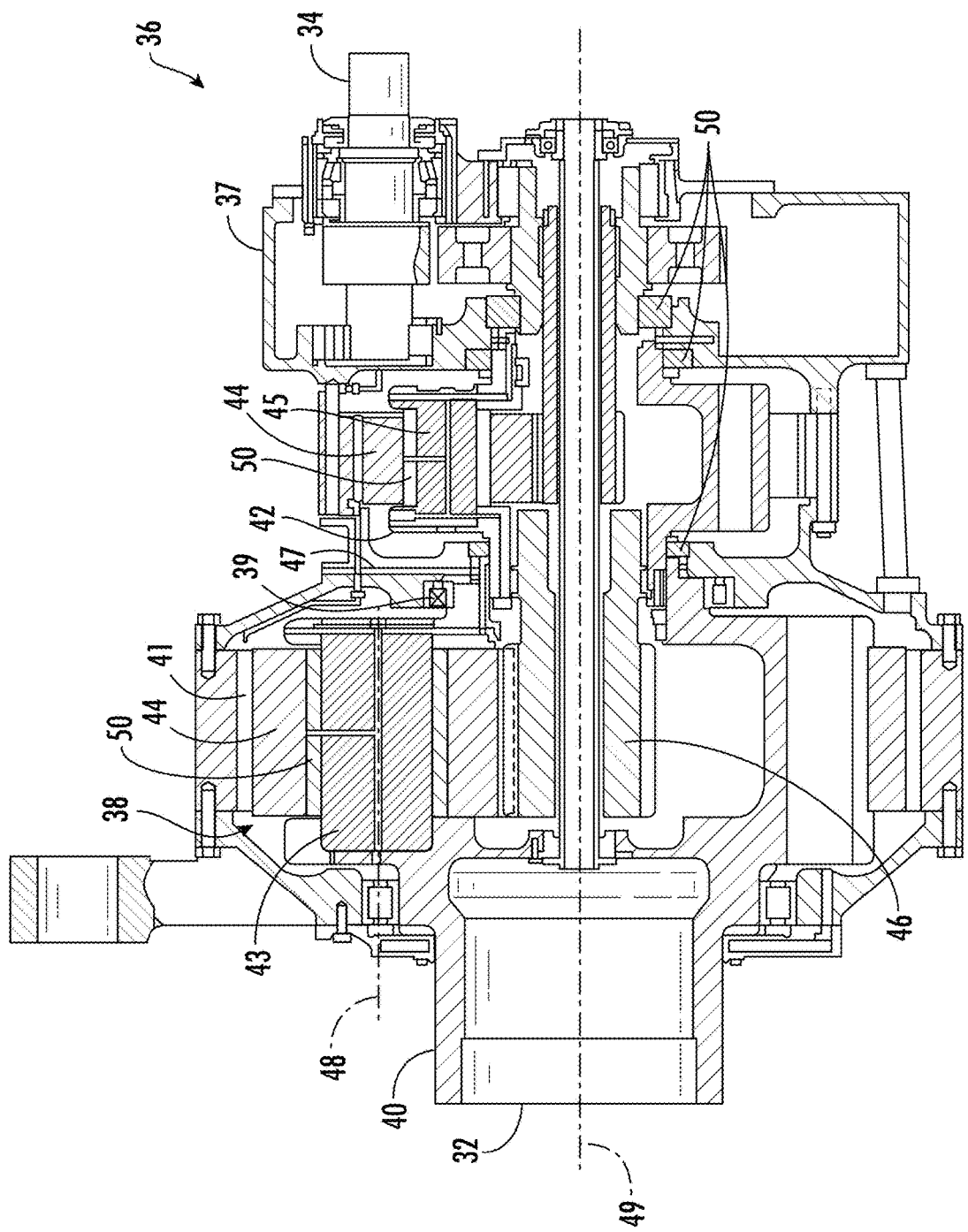
FIG. 3 illustrates a cross-sectional view of one embodiment of a gearbox assembly of a wind turbine according to the present disclosure.

Referring now to FIG. 3, a cross-sectional view of a gearbox assembly 36 according to the present disclosure is illustrated. As shown, the gearbox assembly 36 includes a gear system 38, such as a gear system, housed within a gearbox housing 37. More specifically, the gear system 38 includes a plurality of gears (e.g., planetary, ring, sun, helical, and/or spur gears) and bearings 39 for converting the low speed, high torque input of the rotor shaft 32 to a high speed, low torque output for the generator 24. For example, as shown, the input shaft 32 may provide an input load to the gear system 38, which may provide an output load to the generator 24 (FIG. 2) as is generally known in the art. Thus, during operation, input load at an input rotational speed is transmitted through the gear system 38 and provided as output load at output rotational speed to the generator 24.

Further, the gear system 38 includes a first planetary carrier 40 and a second planetary carrier 42 operatively coupling a plurality of gears. Further, as shown, the gear system 38 includes, at least, a ring gear 41, one or more planet gears 44, a sun gear 46, one or more first pin shafts 43, and one or more second pin shafts 45. For example, in several embodiments, the gear system 38 may include one, two, three, four, five, six, seven, eight, or more planet gears 44. Further, each of the gears 41, 44, 46 includes a plurality of teeth. As such, the teeth are sized and shaped to mesh together such that the various gears 41, 44, 46 engage each other. For example, the ring gear 41 and the sun gear 46 may each engage the planet gears 44. In addition, it should be understood that the gears 41, 44, 46 described herein may include any suitable type of gears, including but not limited to spur gears, face gears, helical gears, double helical gears, or similar.

In some embodiments, one or both of the planetary carriers 40, 42 may be stationary. In these embodiments, the input shaft 32 may be coupled to the ring gear 41, and input loads on the input shaft 32 may be transmitted through the ring gear 41 to the planet gears 44. Thus, the ring gear 41 may drive the gear system 38. In other embodiments, the ring gear 41 may be stationary. In these embodiments, the input shaft 32 may be coupled to the planetary carriers 40, 42, and input loads on the input shaft 32 may be transmitted through the planetary carriers 40, 42 to the planet gears 44. Thus, the planetary carriers 40, 42 may drive the gear system 38. In still further embodiments, any other suitable component, such as the planet gear 44 or the sun gear 46, may drive the gear system 38.

Still referring to FIG. 3, the sun gear 46 defines a central axis 49, and thus rotates about this central axis 49. The ring gear 41 may at least partially surround the sun gear 46, and be positioned along the central axis 49. Further, the ring gear 41 may (if rotatable) thus rotate about the central axis 49. Each of the planet gears 44 may be disposed between the sun gear 46 and the ring gear 41, and may engage both the sun gear 46 and the ring gear 41. For example, the teeth of the gears may mesh together, as discussed above. Further, each of the planet gears 44 may define a central planet axis 48, as shown. Thus, each planet gear 44 may rotate about its central planet axis 48. Additionally, the planet gears 44 and central planet axes 48 thereof may rotate about the central axis 49.

The gearbox assembly 36 may also include a lubrication system or other means for circulating oil throughout the gearbox components. For example, as shown in FIG. 3, the gearbox assembly 36 may include a plurality of oil passages 47 that are configured to transfer oil therethrough. Such oil passages may also be included in the pin shafts described herein and may be formed therein via at least one of casting, additive manufacturing, or machining.

As is generally understood, the oil may be used to reduce friction between the moving components of the gearbox assembly 36 and may also be utilized to provide cooling for such components, thereby decreasing component wear and other losses within the gearbox assembly 36 and increasing the lifespan thereof. In addition, the oil may contain properties that prevent corrosion of the internal gearbox components.

Figure 4:
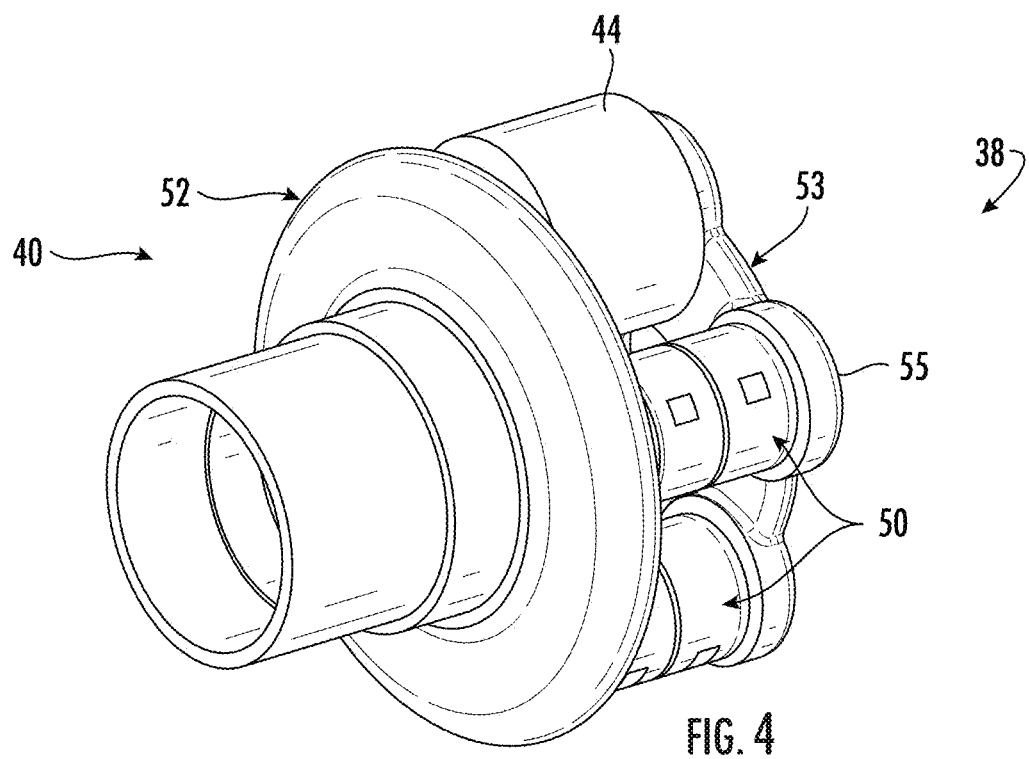
FIG. 4 illustrates a partial, perspective view of one embodiment of the gear system according to the present disclosure, with certain planet gears removed to illustrate internal components thereof.
Figure 5:
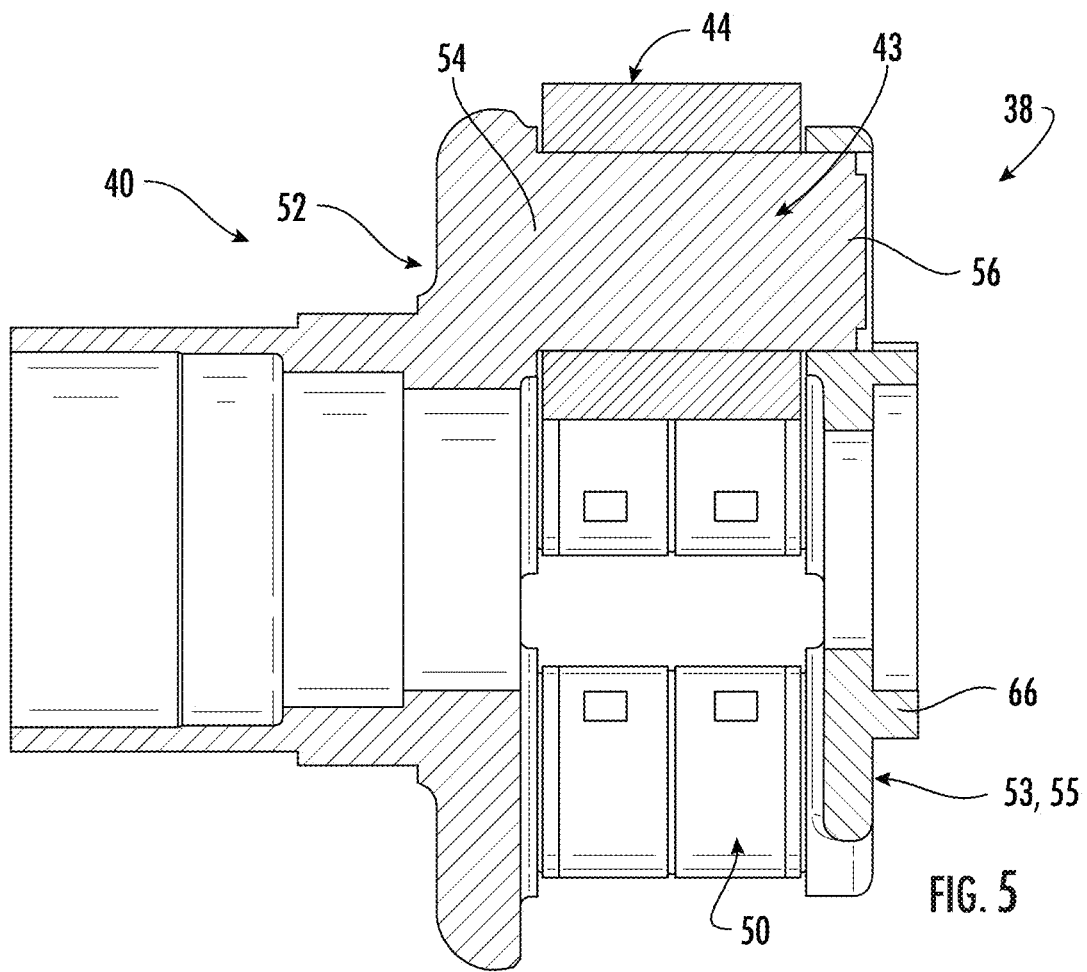
FIG. 5 illustrates a cross-sectional view of one embodiment of the gear system according to the present disclosure.
Figure 6:
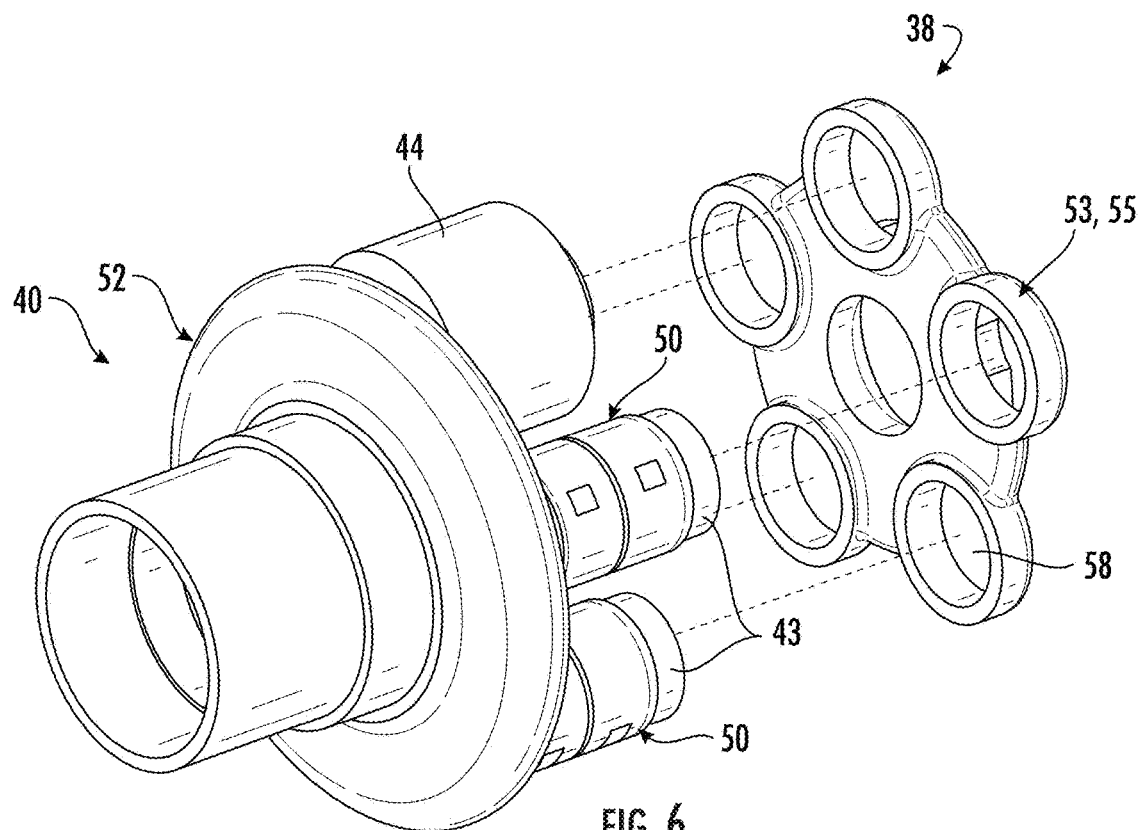
FIGS. 6 and 7 illustrate exploded views of one embodiment of the gear system according to the present disclosure.
Figure 7:
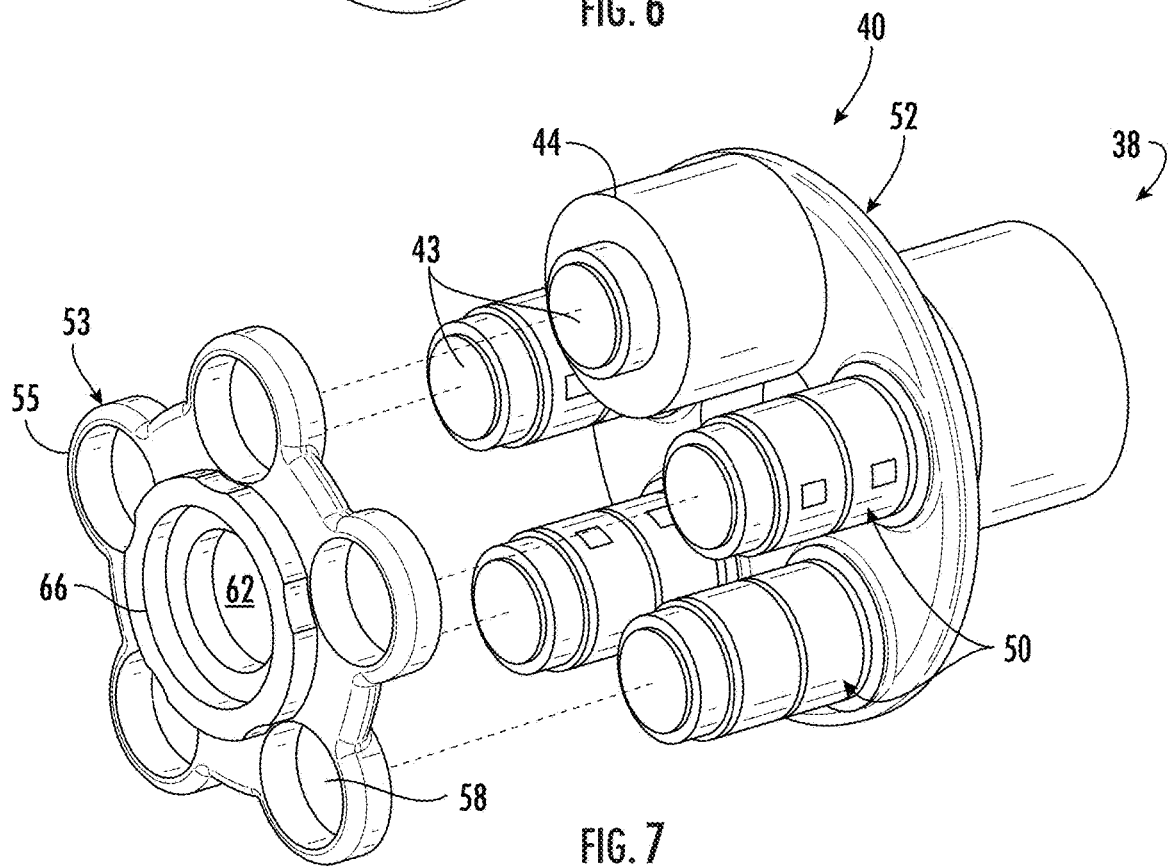
Figure 8:
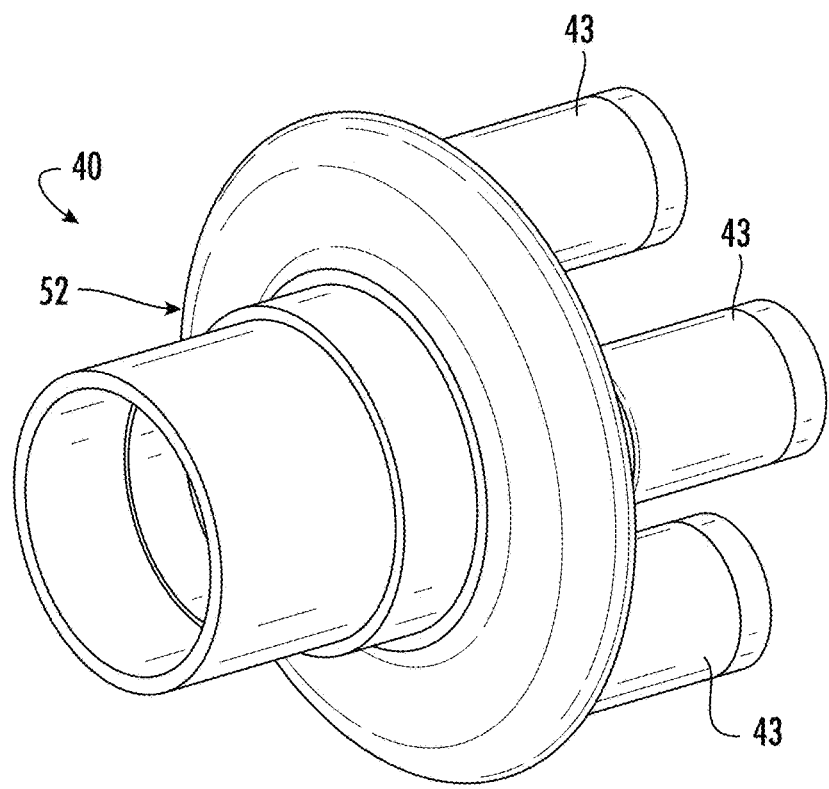
FIG. 8 illustrates a perspective view of one embodiment of one of the integrally-formed carriers and the pin shafts of the gear system according to the present disclosure.
Figure 9:
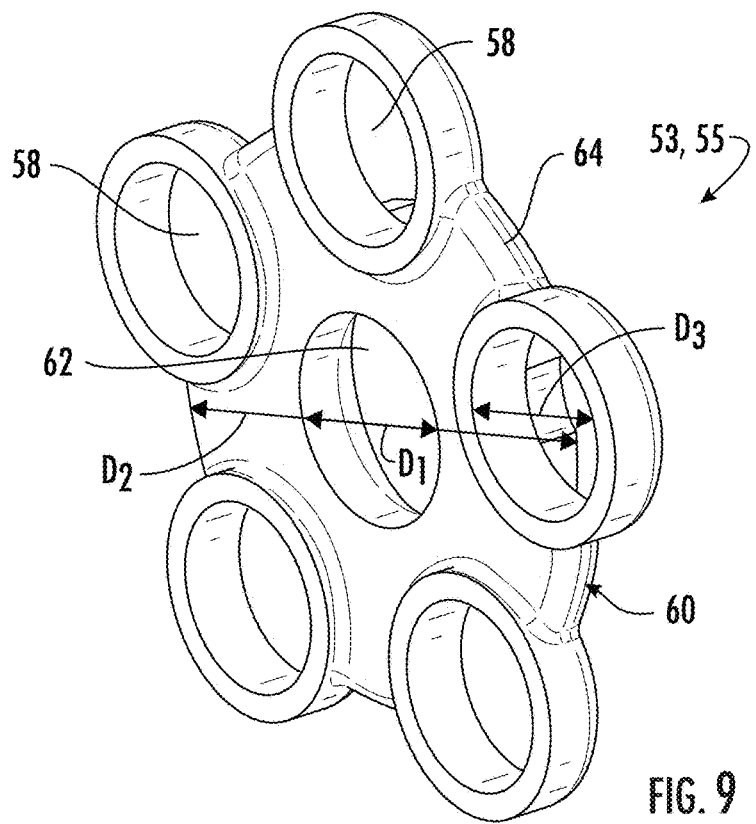
FIGS. 9-11 illustrate various views of one embodiment of the end plate of the gear system according to the present disclosure.
Figure 10:
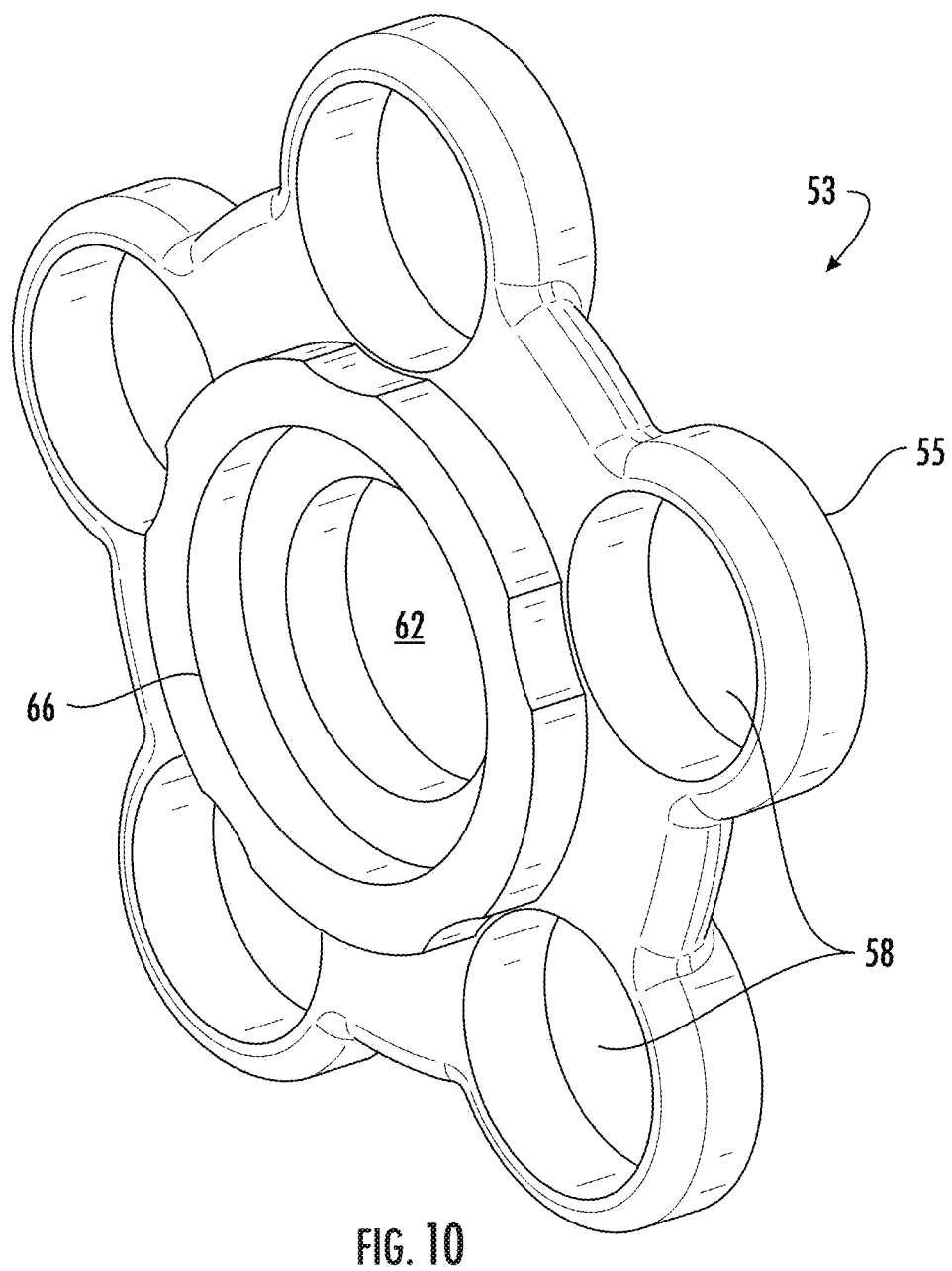
Figure 11:
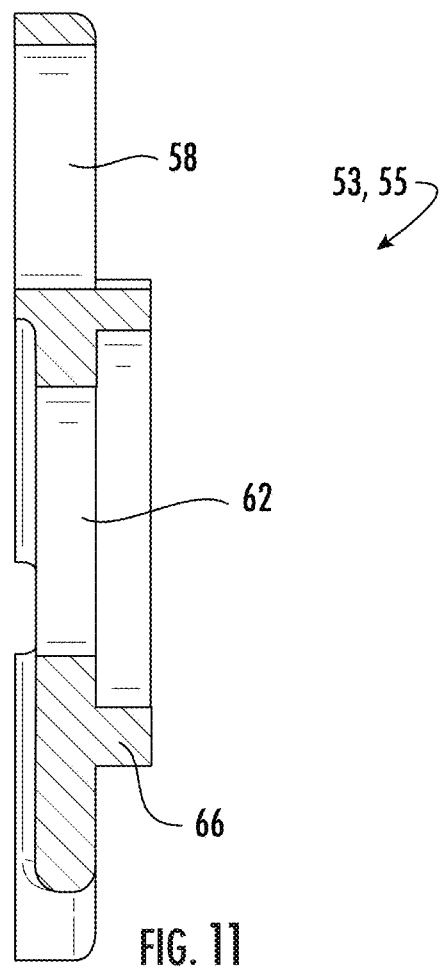
Figure 12:
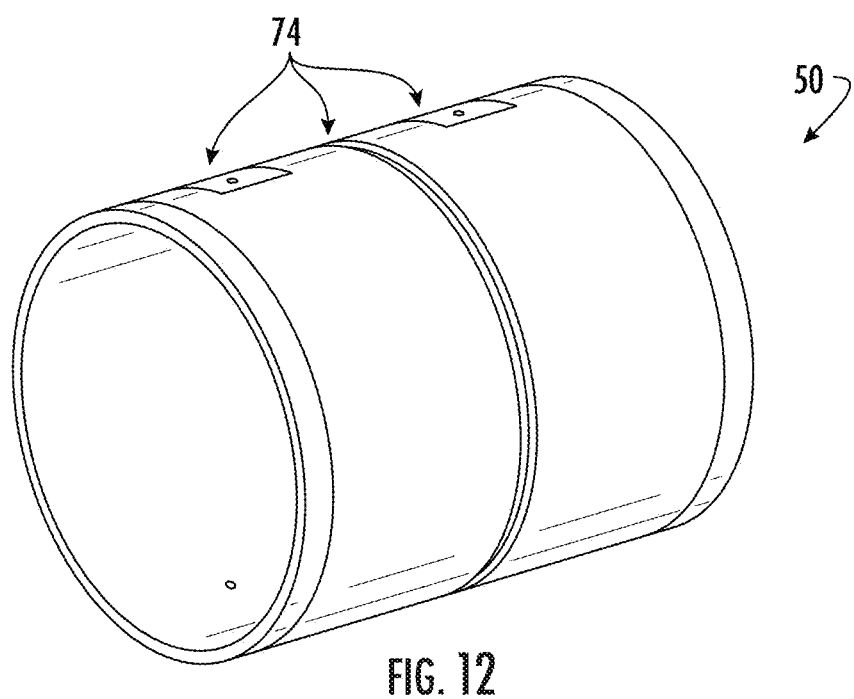
FIG. 12 illustrates a perspective view of one embodiment of one of the bearings of the gear system according to the present disclosure.
Figure 13:
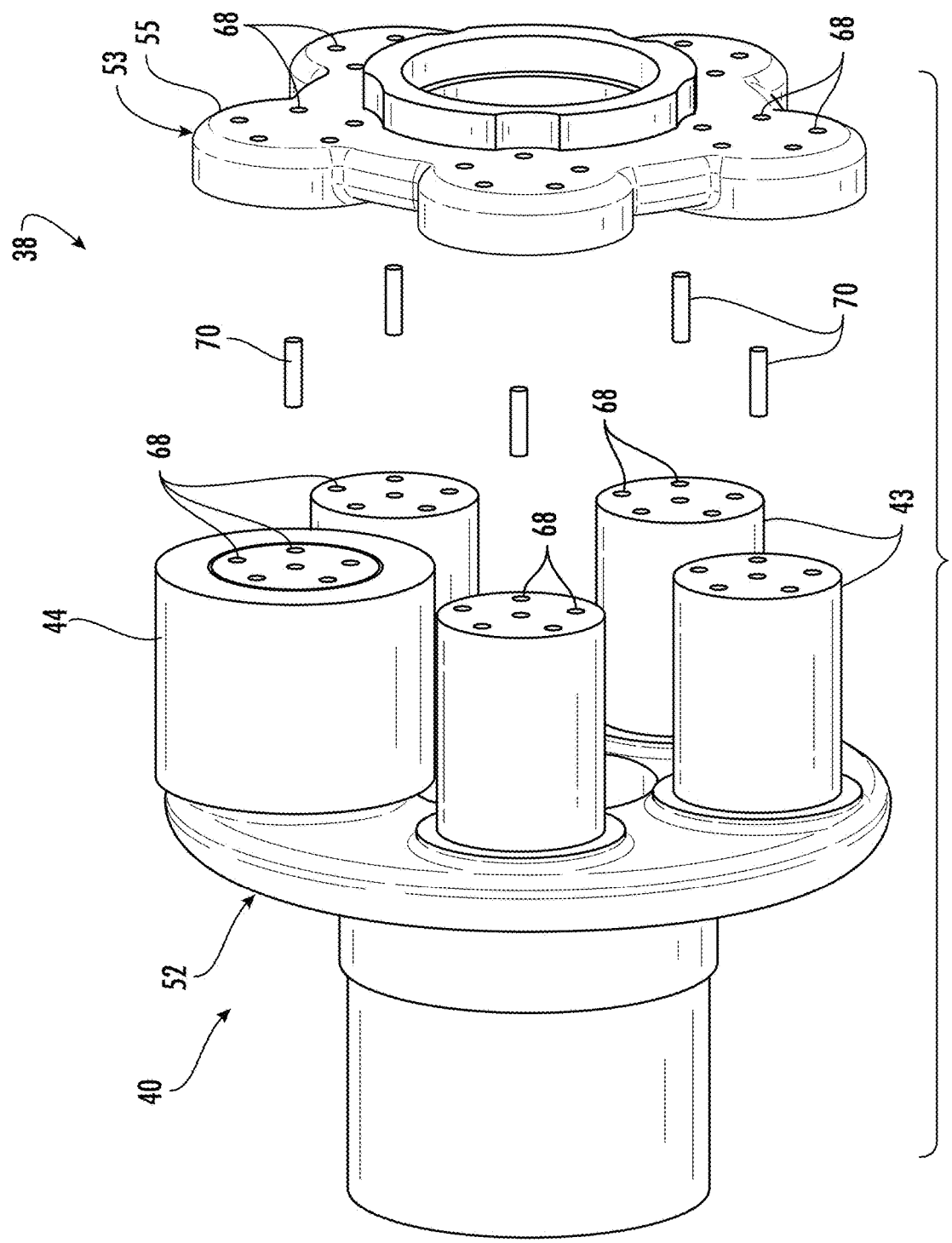
FIG. 13 illustrates an exploded views of another embodiment of the gear system according to the present disclosure.

Referring now to FIGS. 4-13, various views of multiple embodiments of the gear system 38 according to the present disclosure are illustrated. For example, FIG. 4 illustrates a partial, perspective view of one embodiment of the gear system 38 according to the present disclosure, with a portion of one of certain planet gears 44 removed to illustrate internal components thereof. FIG. 5 illustrates a cross-sectional view of one embodiment of the gear system 38 according to the present disclosure. FIGS. 6 and 7 illustrate exploded views of one embodiment of the gear system 38 according to the present disclosure. FIG. 8 illustrates a perspective view of one embodiment of one of the integrally-formed carriers and the pin shafts of the gear system 38 according to the present disclosure. FIGS. 9-10 illustrate various views of one embodiment of the end plate of the gear system 38 according to the present disclosure. FIG. 12 illustrates a perspective view of one embodiment of one of the bearings 50 of the gear system 38 according to the present disclosure. FIG. 13 illustrates an exploded views of another embodiment of the gear system 38 according to the present disclosure.

Though FIGS. 4-13 are illustrated with respect to carrier 40 and pin shafts 43 of the wind turbine 10, it should be understood that the present disclosure can be provided to any carrier of any gear system. As shown particularly in FIGS. 4-7, the gear system 38 includes a two-part carrier 40 (i.e. having first and second portions 52, 53), the pin shafts 43 extending from the carrier 40, and a plurality of gears 44 mounted to the plurality of pin shafts 43. In such embodiments, the gear system 38 may be oriented such that the first portion 52 of the carrier 40 is positioned on a rotor-side of the wind turbine 10 (i.e. closer to the rotor 18 than the generator 24) and the second portion 53 of the carrier 40 is positioned on a generator-side of the wind turbine 10 (i.e. closer to the generator 24 than the rotor 18).

Further, as shown particular in FIG. 5, each of pin shafts 43 has a first end 54 and a second end 56. In an embodiment, one or more of the plurality of pin shafts 43 may be solid. In alternative embodiments, one or more of the plurality of pin shafts 43 may be hollow. Moreover, as shown, the first ends 54 are integrally formed with the first portion 52 of the carrier 40. Thus, in such embodiments, the first ends 54 of the pin shafts 43 being integrally formed with the first portion 52 of the carrier 40 provide structural stability to the gear system 38 such that the gear system 38 can be absent of axially-extending webs between the first and second portions 52, 53 of the carrier 40.

Further, as shown in FIGS. 4-7, each of the plurality of gears 44 are arranged so as to rotate around one of the pin shafts 43. In addition, as shown in FIGS. 4 and 5, the second portion 53 of the carrier 40 may be an end plate 55 that is secured to the second ends 56 of the pin shafts 43. Thus, as shown, when the gear system 38 is assembled, the second portion 53 is separate and spaced apart by a certain distance from the first portion 52 of the carrier 40 such that the first and second portions 52, 53 do not contact each other.

In particular embodiments, as shown particularly in FIGS. 4-7, the end plate 55 may be secured to the pin shafts 43 via an interference fit. More specifically, as shown in FIGS. 6-7 and 9-11, the end plate 55 may include a plurality of shaft holes 58. As such, the end plate 55 may be secured to the pin shafts 43 via an interference fit between each of pin shafts 43 and each of the plurality of holes 58. In other words, the second ends 56 of the pin shafts 43 may be received within the holes formed with the end plate 55.

In alternative embodiments, as shown in FIG. 13, rather than including the shaft holes 58, the end plate 55 and the pin shafts 43 may each may include a plurality of corresponding fastener holes 68. Thus, in such embodiments, the end plate 55 may be secured to the pin shafts 43 via a plurality of fasteners 70 received through the corresponding fastener holes 68. Further, in an embodiment, the plurality of fasteners 70 may include bolts, pins, or the like.

In additional embodiments, as shown particularly in FIGS. 9-11, the end plate 55 may define a shape that includes an annular base portion 60 defining an inner diameter $D_1$ and an outer diameter $D_2$. In such embodiments, the inner diameter $D_1$ may also define a central aperture 62. Accordingly, as shown, the shaft holes 58 may be arranged circumferentially around the central aperture 62 at an edge 64 of the annular base portion 60. Furthermore, as shown, in certain embodiments, outer diameters $D_3$ of each of the shaft holes 58 may extend beyond the outer diameter $D_2$ of the annular base portion 60.

Figure 17:
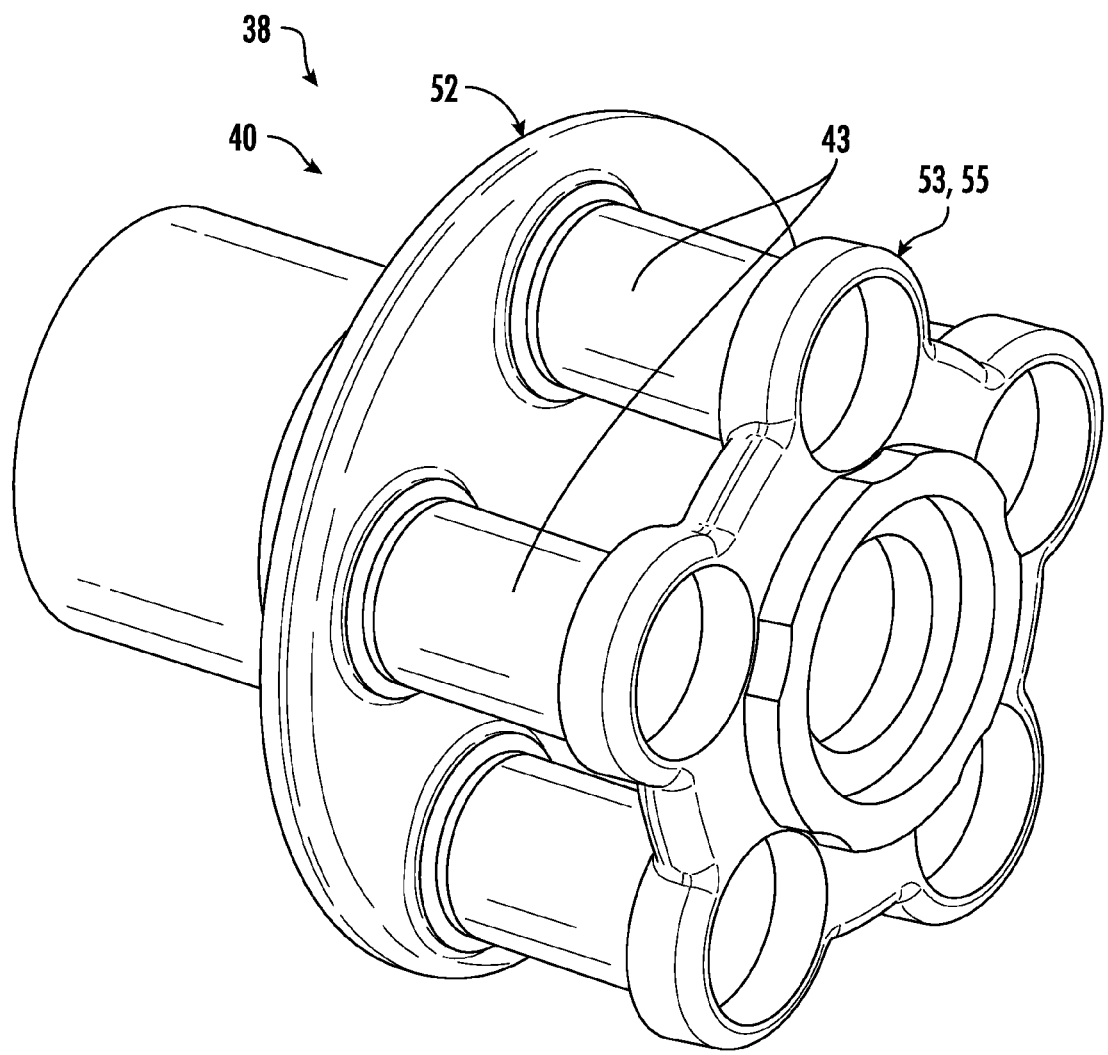
FIG. 17 illustrates a perspective view of one embodiment of an optimized gear system computer representation as generated by a computer-implemented loads model of the gear system, such as finite element analysis (FEA).

Thus, in such embodiments, the design of the gear system 38 (such as the shape of any of the components thereof) can be optimized based on one or more design variables input into a computer-implemented loads model of the gear system 38 so to minimize mass of the end plate 58. For example, FIG. 17 illustrates a perspective view of one embodiment of an optimized gear system computer representation as generated by a computer-implemented loads model of the gear system 38, such as finite element analysis (FEA). As shown, the end plate 55, in particular, may generally have a reduced material mass as compared to a completely solid, circular flange. In addition, in such embodiments, the design variable(s) may include an outer diameter of the carrier 40, an inner diameter of each of the plurality of pin shafts 43 (e.g. making the pin shafts hollow reduces overall mass), the outer diameters $D_3$ of each of the shaft holes 58, the outer diameter $D_2$ of the annular base portion 60, a thickness of the carrier 40, a thickness of each of the shaft holes 58, and/or a thickness of the annular base portion 60.

In still further embodiments, as shown in FIGS. 5, 7, and 10-11, the end plate 55 of the second portion 53 may also include a downwind carrier bearing shoulder 66 arranged circumferentially around the central aperture 62. Further, the downwind carrier bearing shoulder 66 may be on the generator-side of the wind turbine 10.

Referring now in particular to FIGS. 4-7 and 12, the gear system 38 may also include a bearing 50 arranged on each of the pin shafts 43, i.e. between the shafts 43 and the gears 44. For example, in an embodiment, the bearings 50 described herein may correspond to bearings. Accordingly, in certain embodiments, the bearing(s) 50 may be formed directly onto the pin shaft 43, e.g. via an additive manufacturing process. In such embodiments, as shown, an interface between the pin shaft 43 and the bearing 50 may be absent of mechanical fasteners, thereby simplifying the system 38. Accordingly, the bearings 50 of the present disclosure may be mounted to each of the pin shafts 43 via a circumferential bond. More specifically, in certain embodiments, the circumferential bond may include an adhesion bond, a fusion bond, and/or a metallurgical bond spending on the type of additive manufacturing process used to build up the bearing material. Thus, the bond replaces conventional fasteners of prior art assemblies and eliminates interference stresses, thereby enabling a smaller space envelope. In addition, the gear system 38 of the present disclosure requires less material/weight and reduces machining and assembly time.

In certain embodiments, the bearing material may include various metals or metal alloys, including, for example, a copper alloy (e.g. bronze). Thus, the bearing material may provide improved wear characteristics under loading (especially at startup and shutdown, when an oil film may be insufficient to separate the rotating and non-rotating surfaces). In addition, in particular embodiments, the bearing material can be thinner than conventional bearings (e.g. from about 1 millimeter (mm) to about 5 mm as opposed to 10-15 mm).

Figure 15:
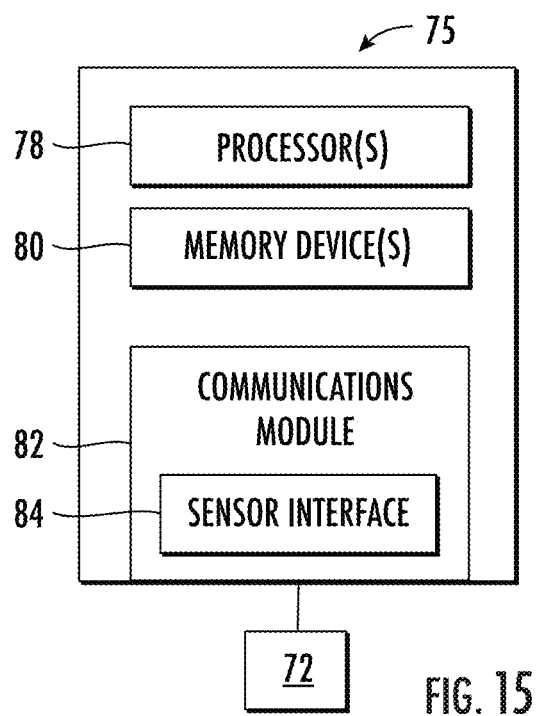
FIG. 15 illustrates a block diagram of one embodiment of suitable components that may be included with a controller of a computer-numerical control device according to the present disclosure.
Figure 16:
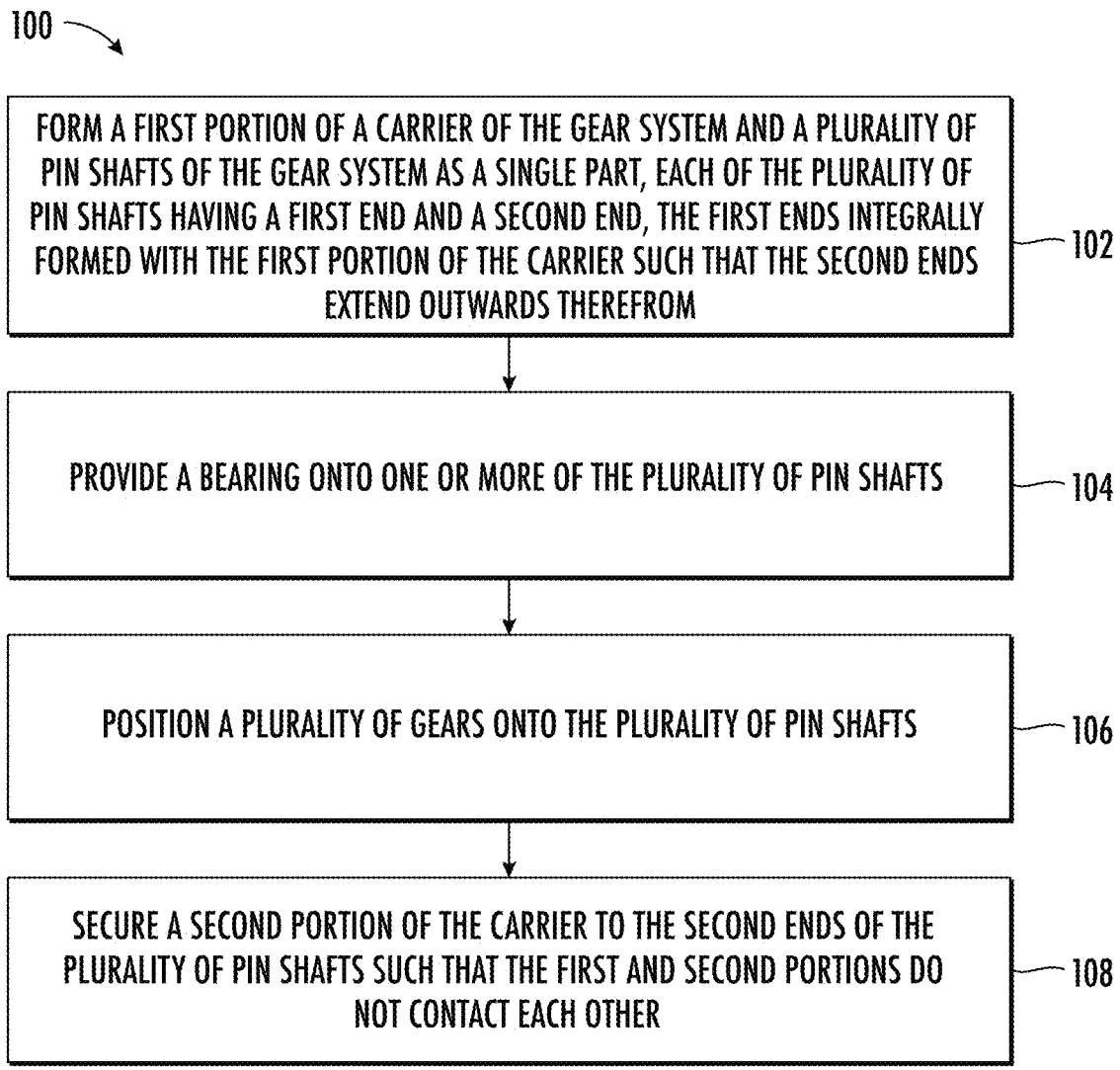
FIG. 16 illustrates a flow diagram of one embodiment of a method for manufacturing a gear system device according to the present disclosure.

Referring now to FIG. 16, a flow diagram of an embodiment of method 100 for manufacturing a gear system of a gearbox of a wind turbine according to the present disclosure is illustrated. In general, the method 100 will be described herein with reference to the gear system 38 shown in FIG. 2-15. However, in other embodiments, the method 100 may be used in connection with any other suitable implement having any other suitable implement configuration and/or with any other suitable system having any other suitable system configuration. Furthermore, it should be appreciated that, although FIG. 16 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown at 102, the method 100 includes forming a first portion 52 of the carrier 40 of the gear system 38 and the plurality of pin shafts 43 of the gear system 38 as a single part. As mentioned, each of the pin shafts 43 may have a first end 54 and a second end 56. Thus, the integral carrier 40 and pin shafts 43 may be formed such that the first ends 54 of the pin shafts 43 are integrally formed with the first portion 52 of the carrier 40 and the second ends 56 extend outwardly therefrom. In certain embodiments, as an example, the first portion 52 of the carrier 40 and the pin shafts 43 may be formed as the single part via casting (as shown in FIG. 8). In alternative embodiments, forming the first portion 52 of the carrier 40 and the pin shafts 43 as the single part may include pouring a liquid material into a mold of the first portion 52 of the carrier 40, allowing the liquid material to solidify in the mold so as to form the first portion 52 of the carrier 40, and then additively molding or printing the pin shafts 43 to the first portion 52 of the carrier 40.

Figure 14:
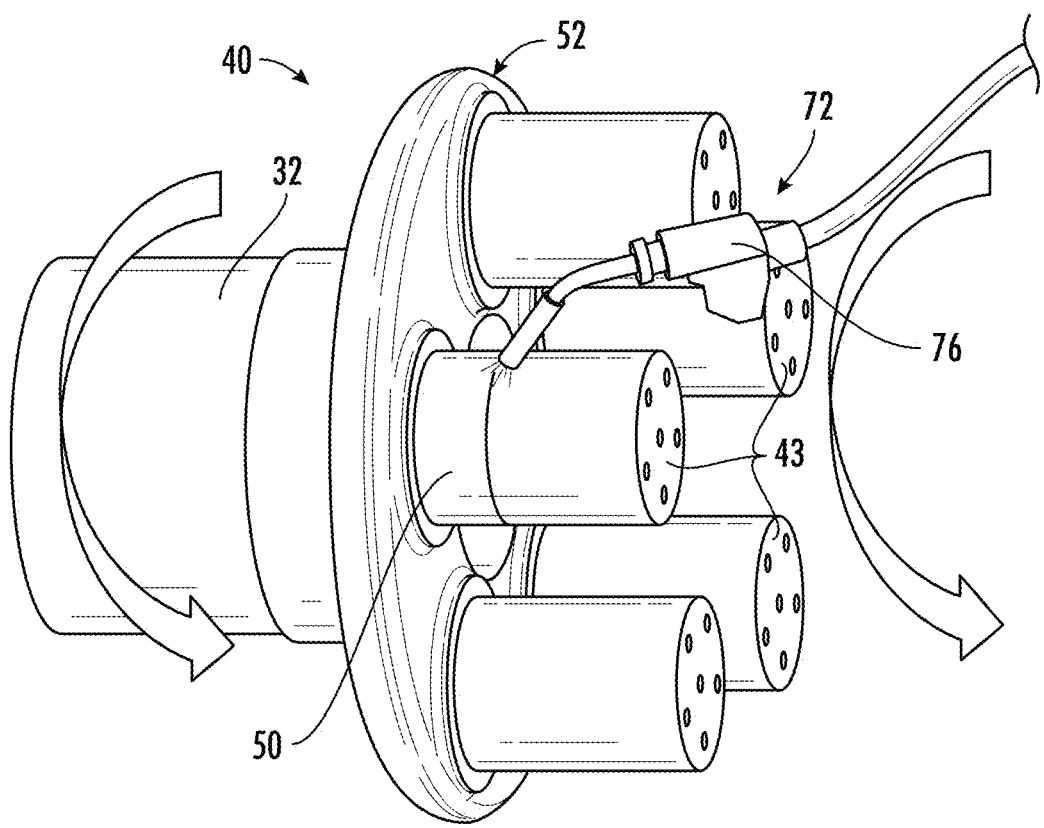
FIG. 14 illustrates a perspective view of one embodiment of one of the integrally-formed carriers and the pin shafts of the gear system according to the present disclosure, particularly illustrating bearings being directly printed onto the pin shafts with a computer-numerical control device via additive manufacturing.

Referring still to FIG. 16, as shown at 104, the method 100 may optionally include providing a bearing 50, such as a journal bearing, onto one or more each of the pin shafts 43, i.e. before positioning the gears 44 onto the pin shafts 43. For example, in an embodiment, as shown in FIG. 14, the method 100 may include forming, via a computer numerical control (CNC) device 72, the bearing(s) 50 directly onto each of the pin shafts 43 via an additive manufacturing process after forming the carrier 40 and the pin shafts 43 as the single part and before positioning the gears 44 onto the pin shafts 43.

Referring still to FIG. 16, as shown at 106, the method 100 also includes positioning a plurality of gears 44 onto the plurality of pin shafts 43 (with or without bearings). Further, as shown at 108, the method 100 includes securing the second portion 53 of the carrier 40 to the second ends 56 of the pin shafts 43 such that the first and second portions do not contact each other. In particular embodiments, securing the second portion of the carrier to the second ends 56 of the pin shafts 43 may include utilizing press fitting or one or more fasteners.

As used herein, additive manufacturing as described herein generally refers to processes used to create a three-dimensional object in which layers of material are deposited or formed under computer control to create an object. More specifically, the additive manufacturing processes described herein may include metal wire transfer, electron beam melting, inertial welding, powder nozzle laser deposition, directed energy deposition, binder jetting, material jetting, laser cladding, cold spray deposition, directed energy deposition, powder bed fusion, material extrusion, direct metal laser sintering, direct metal laser melting, cold metal transfer, metal inert gas (MIG) welding, tungsten inert gas (TIG) welding, vat photopolymerisation, or any other suitable additive manufacturing process now known or developed in the future. Thus, in one embodiment, bearing material may be deposited onto the respective pin shafts(s) 43 layer by layer via the CNC device 72 to build up the bearing 50 via an additive manufacturing process driven.

In additional embodiments, as shown particularly in FIG. 12, the method 100 may also include forming at least one additional feature 74 into one or more of the bearings 50 via additive manufacturing. In such embodiments, the additional feature(s) 74 may include, for example, an oil passage, one or more ribs, one or more channels, or one or more recesses.

Referring particularly to FIGS. 14 and 15, the CNC device 72 described herein may include a controller 75 communicatively coupled to a robotic arm 76 that deposits the bearing material onto an exterior surface of the pin shaft(s) 43, e.g. while the rotor shaft 32 is rotating. Thus, the robotic arm 76 can maneuver around the secured pin shaft(s) 43 as needed so as to build up the bearing material on the pin shaft(s) 43.

In addition, as shown, the controller 75 may include one or more processor(s) 78 and associated memory device(s) 80 configured to perform a variety of computer-implemented functions (e.g., performing the methods, steps, calculations and the like and storing relevant data as disclosed herein). Additionally, the controller 75 may also include a communications interface 82 to facilitate communications between the interface 82 and the various components of the CNC device 72. Further, the communications module 82 may include a sensor interface 84 (e.g., one or more analog-to-digital converters) to permit signals transmitted from one or more sensors or devices to be converted into signals that can be understood and processed by the processor(s) 78. It should be appreciated that the sensors or devices may be communicatively coupled to the communications interface 82 using any suitable means. For example, as shown in FIG. 14, the sensors or devices may be coupled to the sensor interface 84 via a wired connection. However, in other embodiments, the sensors or devices may be coupled to the sensor interface 84 via a wireless connection, such as by using any suitable wireless communications protocol known in the art. As such, the processor 78 may be configured to receive one or more signals from the sensors or devices (such as the robotic arm 72).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 78 is also configured to compute advanced control algorithms and communicate to a variety of Ethernet or serial-based protocols (Modbus, OPC, CAN, etc.). Additionally, the memory device(s) 80 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 80 may generally be configured to store suitable computer-readable instructions that, when implemented by the processor(s) 78, configure the controller 75 to perform the various functions as described herein.

As shown in FIGS. 12 and 14, the CNC device 72 may also be configured to form or print the additional feature(s) 74 into or on an outer surface of the bearing(s) 50 via any suitable additive manufacturing process. In another embodiment, it may also be possible to add additive features onto or into the pin shaft(s) 43 for desired flexibility/stiffness, weight reduction, cooling and/or other related purposes desired for the application. Accordingly, it should be understood that any suitable features may be easily formed into the bearing 50 and/or the pin shaft(s) 43 to locally increase stiffness where desired and/or to provide desired material properties.

Further aspects of the invention are provided by the subject matter of the following clauses:

Clause 1. A gear system, comprising:
a carrier comprising a first portion and a separate, second portion;
a plurality of pin shafts extending from the first portion of the carrier, each of the plurality of pin shafts comprising a first end and a second end, the first ends integrally formed with the first portion of the carrier, the first and second portions arranged on opposing sides of the plurality of pin shafts and being spaced apart such that the first and second portions do not contact each other, the second portion of the carrier defining an end plate that is secured to the second ends of the plurality of pin shafts;
a plurality of gears mounted to the plurality of pin shafts, each of the plurality of gears arranged so as to rotate around one of the plurality of pin shafts.

Clause 2. The gear system of clause 1, wherein the first ends of the plurality of pin shafts being integrally formed with the first portion of the carrier provide structural stability to the gear system such that the gear system is absent of axially-extending webs between the first and second portions of the carrier.

Clause 3. The gear system of clauses 1-2, wherein the end plate comprises a plurality of shaft holes, each of the plurality of shaft holes configured to receive one of the plurality of pin shafts.

Clause 4. The gear system of clause 3, wherein the end plate is secured to the plurality of pin shafts via an interference fit between each of the plurality of pin shafts and each of the plurality of shaft holes.

Clause 5. The gear system of clause 3, wherein the end plate defines a shape that comprises an annular base portion defining an inner diameter and an outer diameter, the inner diameter defining a central aperture, the plurality of shaft holes being arranged circumferentially around the central aperture at an edge of the annular base portion, wherein outer diameters of each of the plurality of shaft holes extends beyond the outer diameter of the annular base portion.

Clause 6. The gear system of clause 5, wherein a design of the gear system is optimized based on one or more design variables input to a computer-implemented loads model of the gear system so as to minimize mass thereof, wherein the one or more design variables comprises at least one of the outer diameter of the first portion of the carrier, an inner diameter of each of the plurality of pin shafts, the outer diameters of each of the plurality of shaft holes, an outer diameter of the annular base portion, a thickness of the first portion of the carrier, a thickness of each of the plurality of shaft holes, or a thickness of the annular base portion.

Clause 7. The gear system of clause 5, wherein the gear system is part of a wind turbine power system, the gear system being oriented such that the first portion of the carrier is positioned on a rotor-side of the wind turbine power system and the second portion of the carrier is positioned on a generator-side of the wind turbine power system.

Clause 8. The gear system of clause 7, wherein the end plate further comprises a downwind carrier bearing shoulder arranged circumferentially around the central aperture, the downwind carrier bearing shoulder being on the generator-side of the wind turbine power system so as to receive a generator shaft.

Clause 9. The gear system of any of the preceding clauses, wherein the end plate and the plurality of pin shafts each comprise a plurality of corresponding fastener holes.

Clause 10. The gear system of clause 9, wherein the end plate is secured to the plurality of pin shafts via a plurality of fasteners received through the plurality of corresponding fastener holes.

Clause 11. The gear system of clause 10, wherein the plurality of fasteners comprise at least one of bolts or pins.

Clause 12. The gear system of any of the preceding clauses, wherein one or more of the plurality of pin shafts are hollow.

Clause 13. The gear system of any of the preceding clauses, wherein one or more of the plurality of pin shafts comprise one or more oil passages formed therein via at least one of casting, additive manufacturing, or machining.

Clause 14. A method for manufacturing a gear system of a gearbox of a wind turbine, the method comprising:
forming a first portion of a carrier of the gear system and a plurality of pin shafts of the gear system as a single part, each of the plurality of pin shafts having a first end and a second end, the first ends integrally formed with the first portion of the carrier such that the second ends extend outwards therefrom;
positioning a plurality of gears onto the plurality of pin shafts; and,
securing a second portion of the carrier to the second ends of the plurality of pin shafts such that the first and second portions do not contact each other.

Clause 15. The method of clause 14, further comprising providing a bearing onto each of the plurality of pin shafts before positioning the plurality of gears onto the plurality of pin shafts.

Clause 16. The method of clause 15, wherein providing the bearing onto each of the plurality of pin shafts before positioning the plurality of gears onto the plurality of pin shafts further comprises forming, via a computer numerical control (CNC) device, the bearing directly onto each of the plurality of pin shafts via an additive manufacturing process after forming the first portion of the carrier and the plurality of pin shafts as the single part and before positioning the plurality of gears onto the plurality of pin shafts.

Clause 17. The method of clause 16, wherein the additive manufacturing process comprises at least one of binder jetting, material jetting, laser cladding, cold spray deposition, directed energy deposition, powder bed fusion, material extrusion, or vat photopolymerisation.

Clause 18. The method of clause 16, further comprising forming at least one additional feature into one or more of the bearings via additive manufacturing, wherein the at least one additional feature comprises at least one of an oil passage, one or more ribs, one or more channels, or one or more recesses.

Clause 19. The method of clauses 14-17, wherein forming the first portion of the carrier and the plurality of pin shafts as the single part further comprises at least one of casting the first portion of the carrier and the plurality of pin shafts as the single part or pouring a liquid material into a mold of the first portion of the carrier, allowing the liquid material to solidify in the mold so as to form the first portion of the carrier, and then additively molding or printing the plurality of pin shafts to the first portion of the carrier.

Clause 20. The method of clauses 13-19, wherein securing the second portion of the carrier to the second ends of the plurality of pin shafts further comprises utilizing at least one of press fitting or one or more fasteners.

This written description uses examples to disclose the invention, including the best mode, and also to enable any person skilled in the art to practice the invention, including making and using any devices or systems and performing any incorporated methods. The patentable scope of the invention is defined by the clauses, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gear system for a wind turbine power system, comprising:
    a carrier comprising a first portion and a separate, second portion;
    a plurality of pin shafts extending from the first portion of the carrier, each of the plurality of pin shafts comprising a first end and a second end, the first ends integrally formed with the first portion of the carrier, the first and second portions arranged on opposing sides of the plurality of pin shafts and being spaced apart such that the first and second portions do not contact each other, the second portion of the carrier defining an end plate that is secured to the second ends of the plurality of pin shafts, the end plate comprising a plurality of shaft holes, each of the plurality of shaft holes configured to receive one of the plurality of pin shafts, the end plate defining a shape that comprises an annular base portion having an inner diameter and an outer diameter, the inner diameter defining a central aperture, the plurality of shaft holes being arranged circumferentially around the central aperture at an edge of the annular base portion, wherein outer diameters of each of the plurality of shaft holes extends beyond the outer diameter of the annular base portion; and
    a plurality of gears mounted to the plurality of pin shafts, each of the plurality of gears arranged so as to rotate around one of the plurality of pin shafts,
    wherein the gear system is oriented such that the first portion of the carrier is positioned on a rotor-side of the wind turbine power system and the second portion of the carrier is positioned on a generator-side of the wind turbine power system,
    wherein a design of the gear system is optimized based on one or more design variables input to a computer-implemented loads model of the gear system so as to minimize mass thereof, wherein the one or more design variables comprises at least one of the outer diameter of the first portion of the carrier, an inner diameter of each of the plurality of pin shafts, the outer diameters of each of the plurality of shaft holes, an outer diameter of the annular base portion, a thickness of the first portion of the carrier, a thickness of each of the plurality of shaft holes, or a thickness of the annular base portion.

2. The gear system of claim 1, wherein the first ends of the plurality of pin shafts being integrally formed with the first portion of the carrier provide structural stability to the gear system such that the gear system is absent of axially-extending webs between the first and second portions of the carrier.

3. The gear system of claim 1, wherein the end plate is secured to the plurality of pin shafts via an interference fit between each of the plurality of pin shafts and each of the plurality of shaft holes.

4. The gear system of claim 1, wherein the end plate further comprises a downwind carrier bearing shoulder arranged circumferentially around the central aperture, the downwind carrier bearing shoulder being on the generator-side of the wind turbine power system so as to receive a generator shaft.

5. The gear system of claim 1, wherein the end plate and the plurality of pin shafts each comprise a plurality of corresponding fastener holes.

6. The gear system of claim 5, wherein the end plate is secured to the plurality of pin shafts via a plurality of fasteners received through the plurality of corresponding fastener holes.

7. The gear system of claim 6, wherein the plurality of fasteners comprise at least one of bolts or pins.

8. The gear system of claim 1, wherein one or more of the plurality of pin shafts are hollow.

9. The gear system of claim 1, wherein one or more of the plurality of pin shafts comprise one or more oil passages formed therein via at least one of casting, additive manufacturing, or machining.

10. A method for manufacturing a gear system of a gearbox of a wind turbine, the method comprising:
    forming a first portion of a carrier of the gear system and a plurality of pin shafts of the gear system as a single part, each of the plurality of pin shafts having a first end and a second end, the first ends integrally formed with the first portion of the carrier such that the second ends extend outward therefrom, wherein forming the first portion of the carrier and the plurality of pin shafts as the single part further comprises at least one of casting the first portion of the carrier and the plurality of pin shafts as the single part or pouring a liquid material into a mold of the first portion of the carrier, allowing the liquid material to solidify in the mold so as to form the first portion of the carrier, and then additively molding or printing the plurality of pin shafts to the first portion of the carrier;
    providing a bearing onto each of the plurality of pin shafts;
    positioning a plurality of gears onto the plurality of pin shafts after the bearings are provided onto each of the plurality of pin shafts; and,
    securing a second portion of the carrier to the second ends of the plurality of pin shafts such that the first and second portions do not contact each other.

11. The method of claim 10, wherein providing the bearing onto each of the plurality of pin shafts before positioning the plurality of gears onto the plurality of pin shafts further comprises forming, via a computer numerical control (CNC) device, the bearing directly onto each of the plurality of pin shafts via an additive manufacturing process after forming the first portion of the carrier and the plurality of pin shafts as the single part and before positioning the plurality of gears onto the plurality of pin shafts.

12. The method of claim 11, wherein the additive manufacturing process comprises at least one of binder jetting, material jetting, laser cladding, cold spray deposition, directed energy deposition, powder bed fusion, material extrusion, or vat photopolymerisation.

13. The method of claim 12, further comprising forming at least one additional feature into one or more of the bearings, the first and second portions of the carrier, or one or more of the pin shafts via additive manufacturing, wherein the at least one additional feature comprises at least one of an oil passages, one or more ribs, one or more channels, or one or more recesses.

14. The method of claim 10, wherein securing the second portion of the carrier to the second ends of the plurality of pin shafts further comprises utilizing at least one of press fitting or one or more fasteners.

* * * * *